United States Patent [19]

Campbell

[11] Patent Number: 4,482,171

[45] Date of Patent: Nov. 13, 1984

[54] PIPE STRESS/STRAIN NEUTRALIZERS

[76] Inventor: Joseph K. Campbell, 215-52nd St., Delta, British Columbia, Canada, V4M 2Y3

[21] Appl. No.: 345,063

[22] Filed: Feb. 2, 1982

Related U.S. Application Data

[63] Continuation-in-part of Ser. No. 6,439, Jan. 25, 1979, Pat. No. 4,317,586.

[51] Int. Cl.³ ............................................. F16L 27/00
[52] U.S. Cl. ..................... 285/95; 285/165; 285/166; 285/370; 285/DIG. 1
[58] Field of Search .................. 285/165, DIG. 1, 95, 285/166, 370

[56] References Cited

U.S. PATENT DOCUMENTS

| | | | |
|---|---|---|---|
| 2,545,701 | 3/1951 | McCausland | 285/228 |
| 3,427,051 | 2/1969 | White et al. | 285/165 |
| 4,361,165 | 11/1982 | Flory | 285/DIG. 1 X |

FOREIGN PATENT DOCUMENTS

| | | | |
|---|---|---|---|
| 1811156 | 6/1970 | Fed. Rep. of Germany | 285/165 |
| 2317614 | 10/1974 | Fed. Rep. of Germany | 285/DIG. 1 |
| 2066399 | 7/1981 | United Kingdom | 285/165 |

*Primary Examiner*—Thomas F. Callaghan

*Attorney, Agent, or Firm*—Sim & McBurney

[57] ABSTRACT

There is provided a pipe joint between a first pipe end and a second pipe end. The pipe joint includes telescoping means allowing the ends to move axially with respect to each other while maintaining fluid-type communication. The joint also includes a plurality of contraction units located exterally of the pipe ends and the telescoping means. Each contraction unit includes a rod member with one end engaged with a first flange member fixed with respect to the first pipe end, while the other end of the rod member is secured to a piston riding in a cylinder with a cylinder bottom, the cylinder being engaged with a second flange member fixed with respect to the second pipe end. The cylinder bottom lies is between the piston and the previously defined one end of the rod member, and the cylinder is displaced axially away from the telescoping means. A fluid conduit connects the interior of one of the pipe ends with the cylinder volume lying between the piston and the cylinder bottom, so that the pressure inside the cylinder volume is a function of the pressure inside one of the pipe ends. This allows compensation for the expansion forces arising from pressure in the pipe joint, but does so with a structure in which the contraction units are not located directly opposite the telescoping means, thus facilitating disassembly for repair and other purposes.

8 Claims, 4 Drawing Figures

PIPE STRESS/STRAIN NEUTRALIZERS

This application is a continuation-in-part of U.S. application Ser. No. 6,439, filed on Jan. 25, 1979 now U.S. Pat. No. 4,317,586.

This invention relates generally to an apparatus for equalizing internal pressure thrusts on pipes or conduits which utilize expansion joints. More particularly, this invention provides an apparatus for opposing or counteracting internal pressure thrusts on conduits having expansion joints, whereby the internal fluid pressure of the medium within the conduit or pipe actuates other expansible and pressure operated thrust-producing means which in turn are linked to parts of the conduit on either side of the expansion joint, in order to provide a counteracting force.

GENERAL BACKGROUND OF THIS INVENTION

Because many pipe installations are subjected to sizeable temperature and pressure variations, it is frequently necessary to provide pipes, ducts and the like with one or more expansion joints to accommodate the pipe growth, shrinkage or displacement.

One approach to solving the problem of providing compensation for separative thrust at expansion joints is exemplified in my own earlier U.S. Pat. No. 4,018,463, issued Apr. 19, 1977. In my earlier patent, the compensating portions are all encased in a large outside cylindrical portion having a maximum diameter appreciably larger than the pipe diameters which the coupling is intended to join. Large annular members are also provided within the cylindrical portion. Articulating connections attached to the annular members are located within the space enclosed by the cylindrical portion, and thus could not be got at for repair or replacement without first entirely disassembling the pipe joint by removal of the cylindrical member. In the embodiments disclosed in my earlier U.S. Pat. No. 4,018,463, such disassembly could not take place while the pipe remained filled with liquid or fluid under pressure, because the cylindrical portion was a pressure-containing member, and its removal would have allowed liquid or fluid to escape from the pipes.

It is now proposed to take a different approach to thrust compensation for expansion pipe joint couplings in which the compensating members are located entirely outside of the expansion pipe joint. Prior art pertinent to this particular approach includes U.S. Pat. No. 2,545,701, McCausland, issued Mar. 20, 1951 and U.S. Pat. No. 3,458,219, Wesch, issued July 29, 1969.

The McCausland patent illustrates the provision of a bellows-like expansion joint, together with a plurality of exteriorly mounted thrust compensating devices, one of which includes a cylinder connected to one pipe end and a piston within the cylinder connected to the other pipe end. The volume within the cylinder on one side of the piston is adapted to be pressurized with the fluid contained in the pipes themselves, and this pressure seeks to cause relative movement between the piston and the cylinder which would compensate for the separative thrust on the expansion joint.

In the Wesch patent, the compensation is brought about by way of tension coiled springs connected between flanges attached to the pipe ends, and a telescoping cylindrical member is provided between the pipe ends to allow the expansion itself to take place.

In the McCausland prior patent, the structure of the thrust-compensating means is not such as to permit the pipe ends to undergo anything but axial displacement with respect to each other, without the risk of binding arising within the piston/cylinder combination. This is so because the piston and cylinder are mounted rigidly with respect to the pipe ends, and any articulation of the pipe ends with respect to each other would "bend" the piston and its piston rod within the cylinder, thus causing binding. A further difficulty with McCausland is the risk of "sag" for the piston and cylinder arrangement under zero pressure, when the pipes are arranged other than vertically. Additionally, the cylinder/piston arrangement in McCausland causes the pipe flanges to be "pulled together", due to the fact that the cylinder is disposed between the two flanges. This results in two disadvantages. The first disadvantage relates to the fact that the flanges must be separated sufficiently to allow the cylinder to be inserted between them, thus establishing a minimum size for the expansion joint. The other disadvantage relates to the question of maintenance and service. In McCausaland, the external compensating cylinders must be completely removed if it is necessary to partially disassemble any of the main pipe expansion assembly. It would be an improvement to provide a thrust compensating arrangement in which access to the main expansion assembly can be had more easily due to the fact that removal of the thrust-compensating portion is simplified. Finally with respect to McCausland, it is noted that the cylinder itself is subject to both tensile stress and hoop stress when in operation. it would be of advantage to eliminate at least the tensile stress in the cylinder.

With respect to the Wesch patent mentioned above, the compensation for axial thrust arises through the provision of coil springs, which results in the disadvantage that the compensation varies with the degree of axial displacement due to the spring constant. A further difficulty is the fact that the degree of angulation permitted between the pipe ends is very restricted due to the provision of essentially cylindrical seats between the portions defining the telescoping assembly.

GENERAL DESCRIPTION OF THIS INVENTION

Accordingly, it is an aim of an aspect of this invention to provide a thrust-compensating expansion joint for pipe ends, in which articulation of one pipe end with respect to the other, as well as axial displacement of the one with respect to the other, is permitted over a relatively large range.

It is an aim of a further aspect of this invention to provide a cylinder/piston thrust-compensating assembly for an expansion pipe joint, in which the cylinder is not subjected to axial stress.

It is an aim of yet a further aspect of this invention to provide a cylinder/piston thrust-compensating assembly for an expansion pipe joint, in which the cylinder is not located radially adjacent the expansion assembly, so that removal thereof to gain access to the expansion assembly itself is facilitated.

It is an aim of a further aspect of this invention to provide a cylinder/piston thrust-compensating assembly for an expansion pipe joint which is mounted in such a way as not to bind upon angular rotation or articulation of one pipe end with respect to the other.

Accordingly, this invention provides, in one aspect thereof, a pipe joint between a first pipe end and a second pipe end. The pipe joint includes telescoping means allowing the pipe ends to move axially with respect to each other while maintaining fluid-tight communication between them. A plurality of contraction units are located exteriorly of the pipe ends and telescoping means, each contraction unit including a rod member having one end engaged with a first flange member fixed with respect to the fist pipe end, the other end of the rod member being secured to a piston riding in a cylinder which has a cylinder bottom engaged with a second flange member fixed with respect to the second pipe end. The cylinder bottom lies between the piston and the one end of the rod member, and the cylinder is displaced axially away from the telescoping means. Fluid conduit means connect the interior of one of the pipe ends with the cylinder volume lying between the piston and the cylinder bottom, whereby the pressure inside the cylinder volume is a function of the pressure inside the pipe itself.

In another aspect, this invention provides a pipe joint between a first pipe end and a second pipe end, the pipe joint including telescoping means allowing the pipe ends to move axially with respect to each other while maintaining fluid-tight communication between them. The telescoping means includes generally cylindrical means which at either end is in fluid-tight, articuable connection with a respective pipe end through spherical bearing means. A plurality of contraction units are provided, located exteriorly of the pipe ends and telescoping means. Each contraction unit includes a cylinder and a piston in the cylinder. The cylinder is connected the first pipe end and the piston is connected to the second pipe end, with the cylinder defining a closed volume on the side of the piston which is closest to the second pipe end. Finally, fluid conduit means connect the interior of one of the pipe ends with the closed volume just defined, so that the pressure in the closed volume is a function of the pressure inside the pipe itself.

GENERAL DESCRIPTION OF THE DRAWINGS

Four embodiments of this invention are illustrated in the drawings, in which.

Figure 1:
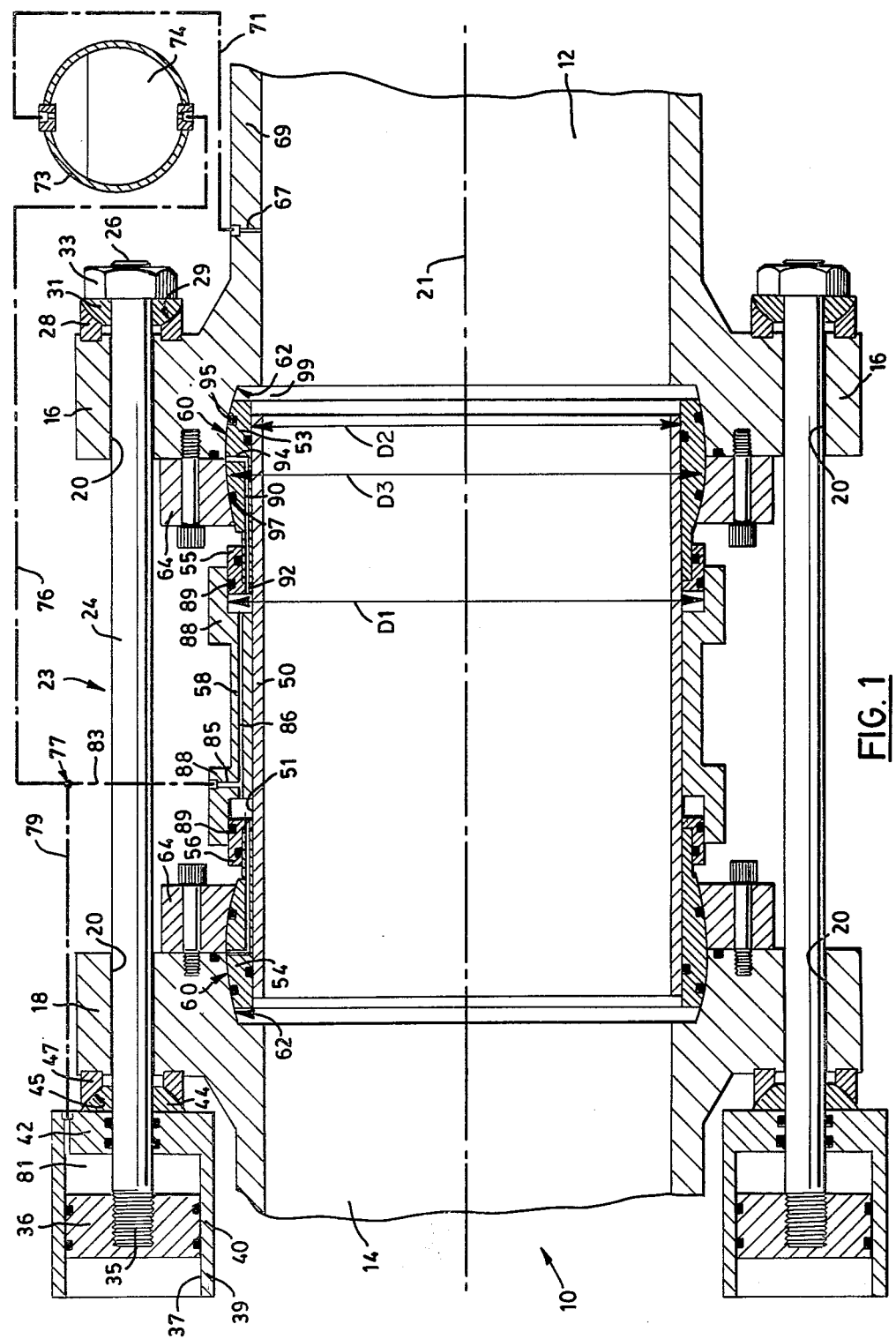
FIG. 1 is an axial sectional view of a first embodiment of this invention.

Attention is first directed to FIG. 1, in which a pipe joint shown generally by the numeral 10 is seen to include a first pipe end 12 and a second pipe end 14. It is to be understood that the pipe ends 12 and 14 may represent literally the ends of two adjacent sections of pipe which are to be joined together by a pressure-compensated telescoping joint, or alternatively may represent attachment members intended to be secured to the actual pipe sections. It will be appreciated from what follows that this distinction has no bearing on the present invention, which functions independently of whether the portions 12 and 14 are the actual pipe ends or attachments thereto.

The first pipe end 12 is integral with a first flange member 16, while the second pipe end 14 is integral with a second flange member 18. The two flanges 16 and 18 are each provided with a plurality of axial bores 20, of which two for each flange are visible in the sectional view of FIG. 1. The bores 20 are equally spaced from the axis 21 of the pipe joint, and are also uniformaly spaced circumferentially around the respective flange members 16 and 18. The piston/cylinder arrangement which permits compensation of the axial separative thrust between the two pipe ends 12 and 14 will now be described with respect to the upper such combination seen in FIG. 1, it being understood that the same description would apply to that shown at the bottom in FIG. 1. The numerals for the various parts have been applied only the the upper part of FIG. 1, in order to avoid cluttering the Figure.

Shown at the top in FIG. 1 is a contraction unit generally designated by the numeral 23, the contraction unit including a rod member 24 having one end 26 engaged with the first flange member 16 through the intermediary of an angular member 28 surrounding the bore 20 on the rightward side of the first flange member 16 (i.e. the side way from the second pipe end 14), defining a female spherical seat 29 in which a male spherical bearing member 31 is seated. The end 26 of the rod member 24 is threaded at its extremity and has threaded thereon a nut 33 which is forced against the bearing member 31 by tension in the rod member 24.

The other end 35 of the rod member 24 has its extremity threaded, and is threadably engaged with a piston 36 sliding in a cylindrical bore 37 of a cylinder 39 which includes side walls 40 and a bottom wall 42, the bottom wall 42 lying between the piston 36 and the second flange member 18. The bottom wall bears directly against a bearing member 44 identical to the bearing member 31, and seated in a female spherical bearing seat 45 defined by an annular member 47 identical to the member 28. The annular member 47 is concentric with the respective bore 20 in the second flange member 18. Due to the construction just described, when the pipe ends 12 and 14 are aligned, the rod member 24 extends axially of the two bores 20 in the flange member 16 and 18. It is to be noted in particular that the bores 20 have a larger inside diameter than the outside diameter of the rod member 24. This, along with the spherical seating defined between the members 28 and 47 on the one hand and the member 31 and 34 on the other, allows the pipe ends 12 and 14 to undergo a limited degree of flexure or bending, in which one pipe end pivots in a plane containing the axes of both pipe ends. It also permits a limited degree of swivelling of one pipe end 12 with respect to the other.

Turning now to the actual joint itself, a structure will be described which permits the pipe ends 12 and 14 to move axially away and towards each other, to swivel to a limited degree about their common axis with respect to each other, and to undergo flexure or pivotal movement in a plane containing both axes.

There is provided a cylindrical member 50 having a smooth, cylindrical outer surface 51 upon which rides a first ring member 53, a second ring member 54, a first L shaped member 55, a second L shaped member 56, and a bridge member 58.

It will be seen that each of the ring members 53 and 54 defines an outwardly facing male spherical surface 60 which seats against a female spherical bearing surface defined in part by a recess 62 in the respective pipe end, and in part by a ring portion 64 in the shape of an annulus adapted to be securely bolted to the face of the respective flange member 16 and 18.

As can be seen in FIG. 1, all of the mating sliding surfaces between the various members just described are provided with suitable seals of a conventional nature, which need not be described in detail with the exception of certain ones which play a role in pressure balancing and equalization for the various components 53, 54, 55, 56 and 58.

Before describing this balancing arrangement, attention is directed to the right in FIG. 1 where an access port 67 is shown through the wall 69 of the first pipe end 12. A broken line 71 represents a pressure conduit extending from the access port 67 to an accumulator 73. It is to be understood that the accumulator 73 would be used only in the case where the pipe contained a gaseous material, the function of the accumulator being to transfer the pressure of the gaseous material to a hydraulic fluid 74, which then is used to act upon the various components involved in the telescoping arrangement, and also to operate the piston/cylinder arrangement described earlier. It will be seen that the conduit 71 enters the accumulator 73 at the top, and that a further conduit 76 exits from the accummulator 73 at the bottom thereof, and branches at 77 to provide one line 79 connecting through the bottom wall of the cylinder 39 to supply pressurized hydraulic fluid to a chamber 81 defined between the piston 36 and the bottom wall 42. A second line 83 extends from the junction 77 downwardly to the bridge member 58, where it enters a passageway 85 which in turn communicates out either end of the bridge member 58 along a passageway 86. The passageway 86 opens into a small variable space between the bridge member 58 and the respective L-shaped members 55 and 56. In particular, it will be noted that the bridge member 58 defines two flanges 88, each having an internal cylindrical surface adapted to bear slidingly against the outer surface of the respective L-shaped member 55 and 56. Seals 89 are provided at this mating surface, to prevent loss of fluid from the chambers just mentioned. In FIG. 1, the diameter of the inside cylindrical seat defined by flanges 88 is identified as D1 whereas the outside diameter of the cylindrical member 50 is identified as D2. It will be seen that the annular chamber defined between the bridge member 58 and each of the L-shaped members 55, 56 has the outside diameter D1 and the inside diameter D2. Thus, the force seeking to separate the bridge member 58 from each of the L-shaped members 55, 56 will be the product of the pressure in the respective chamber defined between them, multiplied by the area between the diameters D1 and D2. Due to symmetry, the bridge member 58 will be in balance. With reference to ring member 53 it will be seen that a passageway 90 therein communicates with a short passageway 92 and an L-shaped member 55, and further communicates with a radial passageway 94 which opens through the topmost point of the spherical curvature 60, and also opens at the inter face between the cylindrical member 50 and the ring member 53. Two seals 95 and 97 are located at equal radii from the axis 21, and therefore there is a balance of forces arising at the spherical mating surfaces in the region lying between the seals 95 and 97. However, a further force arises, due to the gap 99 between the ring member 53 and the pipe end 12, which gap communicates with the center of the pipe end 12, and therefore is subject to the pressure of the contents thereof. The diameter D3 represents the effective acting distance of the seals 95 and 97, and therefore also represents the outer limit of the area over which the pressure in the gap 99 will act. The inner limit is D2, since the cylindrical member 50 is in balance, due to the fact that the same pressure is exerted at both of its ends. In the embodiment of FIG. 1, D1 is equal to D3, and therefore the pressure arising in the chamber defined between the bridge member 58 and the L-shaped member 55 exactly counter balances the pressure arising from the gas present in the gap 99. The same balance takes place at the other end of the cylindrical member 50, but does not need to be described in detail.

It is to be noted in particular that the cylinder 39 lies "outboard", i.e. axially displaced away from, the portions just described which allow for telescoping and flexing of the joint between the two pipe ends 10 and 12. The effect of displacing the cylinder 39 and the piston 36 axially away from the active portions between the pipe ends 12 and 14 is to allow a more compact structure, and particularly to allow access to the parts numbers 53, 54, 55, 56 and 58 merely by unscrewing the bolts 33. Once this has been done, the rod member 24 need merely be slid out leftwardly from the bores 20 and the flange member 16 and 18, thus removing any obstacle to disassembly and repair of the basic telescoping and flexing joint.

Figure 2:
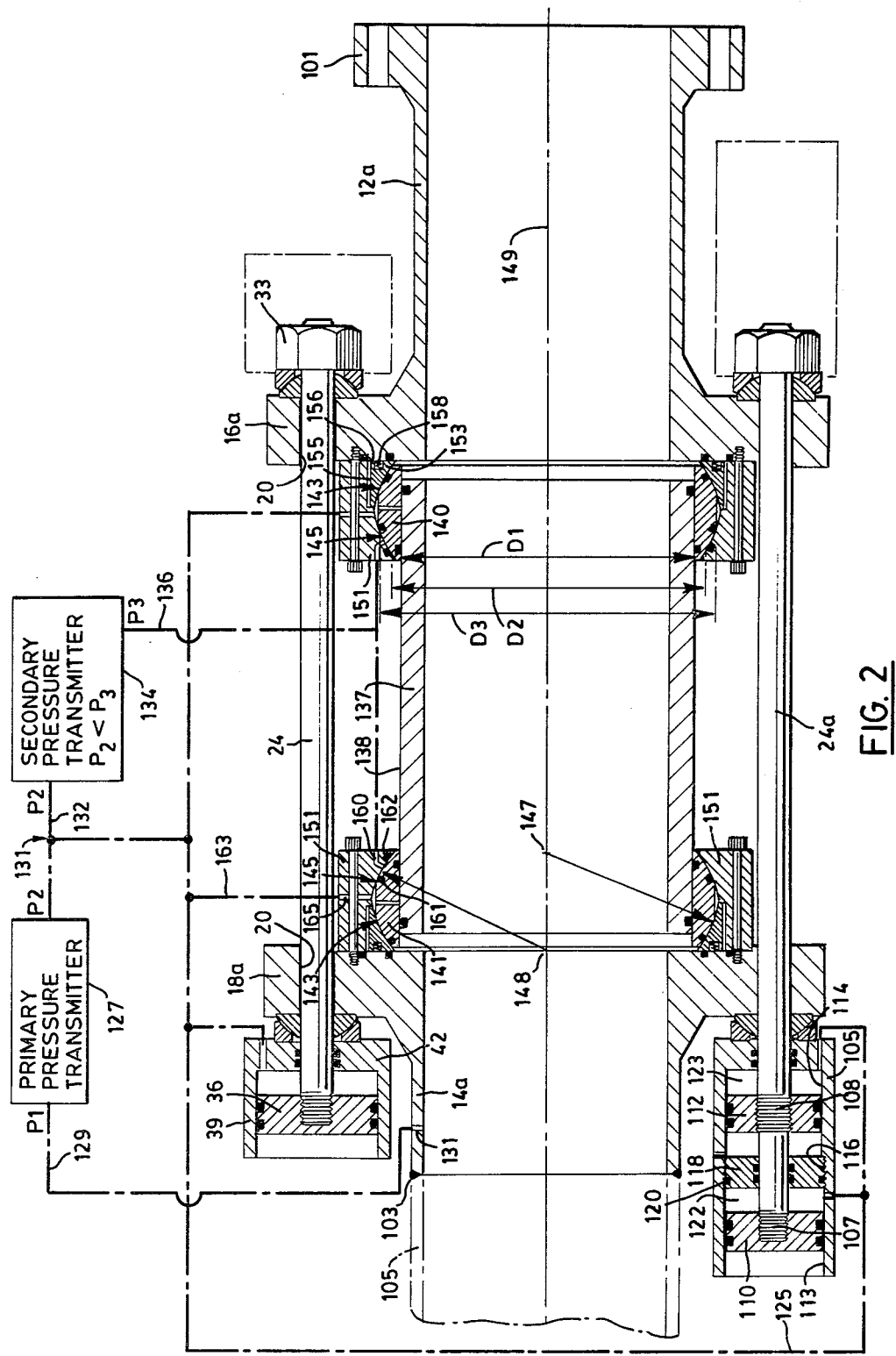
FIG. 2 is an axial sectional view of a second embodiment of this invention.

Attention is now directed to FIG. 2, which shows the second embodiment of the invention. In FIG. 2, the pipe end 12a is shown as a sleeve member which is adapted by way of a flange 101 to be bolted securely and in sealed relationship with an actual pipe end. To the left in FIG. 2, the pipe end 14a is welded at 103 to an actual pipe section 105 drawn in broken lines. These represent two possible ways of connecting flange members 16a and 18a to respective pipe sections.

Looking at the top portion of FIG. 2, the rod member 24 is identical to rod member 24 in FIG. 1, as are the other portions of that assembly, including the cylinder 39, and the piston 36. In FIG. 2, the male and female bearing seats between the parts numbers 31, 28 and 44, 47 are reversed, but it will be understood that such reversal has no effect on the basic function of spherical seats. Again bores 20 are provided and are larger in diameter than outside diameter of the rod member 24.

At the bottom in FIG. 2, a variation of the cylinder is illustrated. At bottom left, a cylinder 105 is elongated, and a rod member 24a, while having at its rightward end the same construction and attachment system as is shown at the top of FIG. 2, has at its leftward end two threaded regions 107 and 108, each of which engages a respective piston 110 and 112. The pistons 110 and 112 slide in respective cylindrical bores 113 and 114, the bore 113 having a slightly larger diameter than the bore 114 by reason of the provision of an internal thread 116 adapted to be engaged by an intermediate wall member 118 having external threads and a seal 120.

The cylinder and multiple piston arrangement shown at the bottom left in FIG. 2 has the construction disclosed and claimed in my earlier U.S. patent application Ser. No. 6,439, filed on Jan. 25, 1979, now U.S. Pat. No. 4,317,586, and therefore does not need to be described in greater detail. The basic effect of ganging the pistons 110 and 112 is to permit a smaller diameter cylinder for the same net force, since each piston contributes its own component to the force, just as if the other piston where not acting. The pressure chambers 122 and 123 associated with the pistons 110 and 112 respectively are fed from a conduit 125 which connects with the output from a primary pressure transmitter 127 having an input line 129 connected to an access port 131 through the wall of the pipe end 14a. The primary pressure transmitter 127 may be of the same construction and effect as the accumulator 73 shown in FIG. 1. More specifically, pressure P2 is the same as P1, but the fluid in the line 125 is a hydraulic liquid, whereas the fluid in the line 129 may be a gaseous material.

From a junction location 131, a further conduit 132 proceeds to a secondary pressure transmitter 134, of which the output in conduit 136 is greater than the input pressure P2. The fluid in the conduit 136 may also be pressurized hydraulic liquid, and its function at the higher pressure will be described after the description of the parts permitting telescoping and flexing action of the pipe ends 12a and 14a.

The structure includes a cylindrical member 137 having a cylindrical outer surface 138 which slidingly mates with the inside cylindrical bearing surfaces of two ring members 140 and 141. Each ring member 140, 141 defines two outer spherical male surfaces 143 and 145 of which the centers of curvature 147 and 148, respectively are spaced apart along the axis 149 of the cylindrical member 137, so that the axial section of each ring member 140, 141 (i.e. the section seen in FIG. 2) is that of an ogive. More specifically the ogive is known technically as a "dropped ogive" which is an ogive defined by two circular arcs which are such that the center of each arc lies within the other arc. This takes place so long as the distance separating the centers of curvature is less than the radius of the smallest arc. In the present case the two radii are the same, and it can be clearly seen in FIG. 2 that the distance separating the centers of curvature 147 and 148 is less than the radii.

Each pipe end 12a and 14a fixedly supports a ring portion 151 which defines an internal female spherical surface mating with the male surface 145 of the respective ring member 140 and 141. The ring portions 151, however, are recessed away from the surfaces 143, to define an annular gallery which is wedged-shaped in radial section, in which a floating annulus 153 is lodged. In particular, each floating annulus 153 has an outer diameter less than the inner diameter of the recess of the ring portion in which it is lodged. In section, each floating annulus 153 defines a female spherical seat mating with the respective surface 143 of the respective ring member 140, 141, has a substantially cylindrical outer surface 155, and has a substantially planar end face 156. The end face 156 is intended to bear against the respective flange member 16a, 18a, but is biased away from its respective flange member by a plurality of compression coil springs 158 which are distributed uniformly around the floating annulus 153. Because each floating annulus 153 is in a relatively "loose" compartment, and because it is biased towards its respective cylindrical male surface 143 by the springs 158, it will tend to remain seated against the surface 143 as the respective pipe end swivels with respect to the cylinder 137, provided the swivelling or flexure is of a limited extent, for example not more than that which would cause the outer surface 155 of floating annulus 153 to "bottom out" against the inner surface of the ring portion 151. This "bottoming out" feature will generally be provided to prevent excessive clearance occurring between the end face 156 of the floating annulus 153, and the adjacent sliding surface of flage members 16a, 18a. Under normal circumstances this swivelling capability is likely to be less than 10° at each end.

Referring now to the leftward ring member 151 in FIG. 2, it will be seen that the higher pressure P3 exiting from the secondary pressure transmitter 134 passes through a port 160 into the space between two dynamic seals 161 and 162. The seals 161 and 162 are at diameters D3 and D2 respectively from the axis 149. Hence, a force will act leftwardly against the ring member 141 which will be the product of the pressure P3 and the area defined between the diameters D2 and D3.

The pressure P2 is admitted along conduit 163 through port 165 to the region above the ring member 141 (which has a cylindrical facet at its peak), and since P1 is equal to P2, the force being exerted rightwardly on the ring member 141 will be equal to the product of P2 and the area represented between diameter D3 and diameter D1, the latter being the outside diameter of the cylindrical member 137. By correctly selecting the ratio between pressures P2 and P3, the ring members 140 and 141 can be brought into dynamic hydraulic balance.

Figure 3:
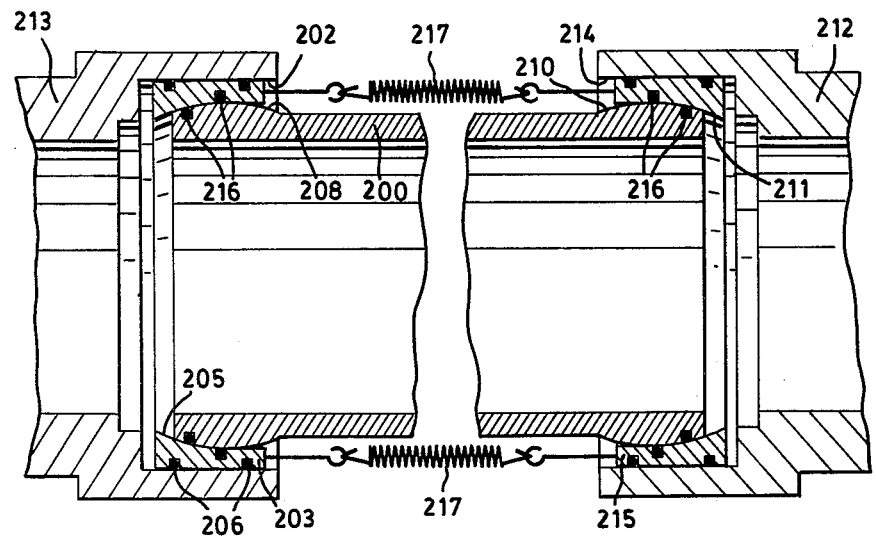
FIG. 3 is an axial sectional view of a third embodiment of this invention.

FIG. 3 shows a further constructional variant, representing the third embodiment of the invention. In FIG. 3, the sectional view is only of the telecoping means, since the remainder of the pipe joint involving the contracting units remains unchanged.

The third embodiment of this invention is capable of a significant degree of articulation about an axis normal to the pipe length connected by the pipe joint, i.e. with the pipes bending away from a position of axial alignment with each other. This freedom of articulation is provided due to spherical connections between a cylindrical member 200, and pipe ends 212 and 213. More particularly, pipe end 213 provides an internal cylindrical surface 202 along which a ring member 203 is adapted to slide. The ring member 203 defines a cylindrical surface on its outside which is received snugly but slideably within the surface 202, and defines a spherical surface 205 on its inside. Suitable seals 206 are provided between the ring member 203 and the pipe end 213. The leftward end of the cylindrical member 200 is shaped to define a male spherical bearing surface mating with the female spherical bearing surface 205 of the ring member 203.

Likewise, at the rightward end of the cylindrical member 200 there is a further male spherical bearing surface 210 which mates with a female spherical bearing seat 211 in a further ring member 215 slideably received within an internal cylindrical surface 214 of the pipe end 212. The seal between the male surfaces and the corresponding female seats is ensured by rings 216, and these surfaces are maintained in sealed contact by coil springs 217, which may be of any size and number capable of keeping the seals tight.

It can thus be seen that the arrangement of FIG. 3 is capable of permitting longitudinal axial movement of the pipe ends with respect to each other, due to the slideability of ring members 203 and 215 with respect to the pipe ends 213 and 212 respectively. Furthermore, the individual pipe ends 213 and 212 can angulate or articulate with respect to the appropriate end of the cylindrical member 200, in order to allow for articulation between the pipe ends themselves.

Figure 4:
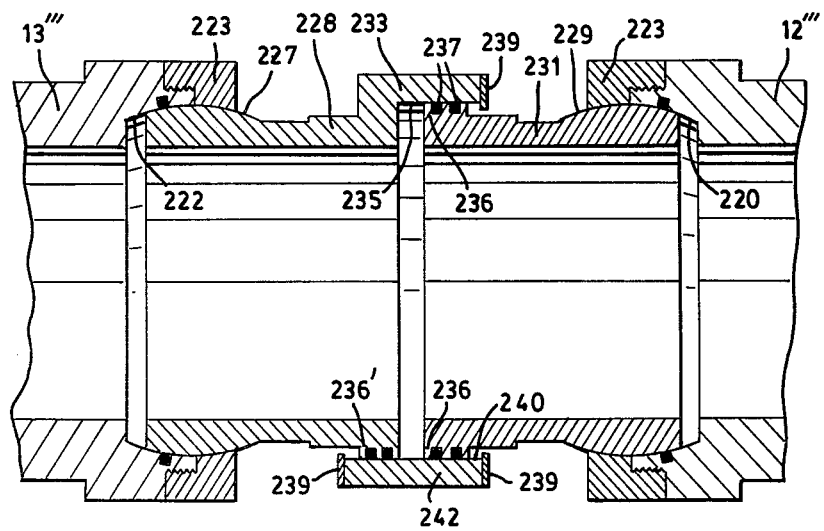
FIG. 4 is an axial section view of a fourth embodiment of this invention.

FIG. 4 shows the fourth embodiment of this invention, which is also adapted to permit articulation or angulation between the pipe ends. In the FIG. 4 arrangement, the pipe ends 12''' and 13''' each define a female spherical bearing seat 220 and 222, respectively. To give the female bearing seat a maximum diameter at a location other than the open end, a ring member 223 is threaded onto the projecting pipe ends 12''40 and 13'''. Captured within the female spherical bearing seat 222 is a male spherical bearing surface 227 on the leftward end of a first cylindrical member 228. Captured within the female spherical bearing seat 220 is a male spherical bearing surface 229 on the rightward end of a second cylindrical member 231.

The cylindrical member 228 and 231 are shown to be slideably linked together by one particular arrangement in the upper half of FIG. 4, and by an alternative arrangement in the lower half of FIG. 4. It is to be understood that what is shown above and below the center line would not simultaneously apply. In a given installation, the section at the top would be used all the way around, or alternatively the section at the bottom would be utilized throughout. In the upper half of FIG. 4, it can be seen that the cylindrical member 228 has an outwardly stepped cylindrical projection 233 which defines an internal cylindrical surface 235. The cylindrical member 231 has a short outward flange portion 236 defining an external cylindrical surface adapted to be snugly but slideablty received within the surface 235. O-rings 237 are provided for sealing the surfaces. An end cap 239 is provided to ensure that the flange 236 will not move out of contact with the surface 235. In the lower part of FIG. 4, the alternative construction is one in which both of the cylindrical members 228 and 231 have identical outward flanges 236' and 236, respectively. These flanges have similar external cylindrical which ride snugly but slideably within the internal cylindrical surface 240 of an external ring 242, which surrounds the inner ends of both of the cylindrical members 228 and 231.

The ring member 242 has two end caps 239 to prevent the cylindrical members 228 and 231 from becoming disengaged from the ring member 242.

In all of the embodiments described in this specification, some degree of rotational movement of one pipe end with respect to the other is possible, due to the universal joint nature of the connections of the contraction units illustrated in FIGS. 1 and 2. Typically, however, two pipe ends connected together would not be called upon to rotate through a significant angle with respect to each other, but a small amount of rotational freedom, up to a few degrees, is desirable in order to ease stress in the connected members.

While particular embodiments of this invention have been shown in the accompanying drawings and described in the foregoing disclosure, it will be apparent to those skilled in the art that changes and modifications made be made thereto without departing from the scope of the invention as set forth in the appended claims.

I claim:

1. A pipe joint between a first pipe end and a second pipe end, the pipe joint comprising:

telescoping means allowing the ends to move axially with respect to each other while maintaining fluid-tight communication between them, a plurality of contraction units located exteriorly of the pipe ends and telescoping means, each contraction unit including a rod member having one end engaged with a first flange member fixed with respect to the first pipe end, the other end of the rod member being secured to a piston riding in a cylinder having a cylinder bottom, the cylinder being engaged with a second flange member fixed with respect to the second pipe end, the cylinder bottom lying between the piston and the said one end of the rod member, the cylinder being displaced axially away from the telescoping means, and fluid conduit means connecting the interior of one of the pipe ends with the cylinder volume lying between said piston and said cylinder bottom, whereby the pressure inside said cylinder volume is a function of the pressure inside said one of the pipe ends, said one end of each rod member having affixed to it a first spherical bearing riding in a first spherical seat supported by the first flange member on the side thereof remote from the telescoping means, said cylinder bottom having affixed to it a second spherical bearing riding in a second spherical seat supported by the second flange member on the side thereof remote from the telescoping means, whereby the entire cylinder lies on the side of the second flange member which is remote from the telescoping means, and whereby the pipe ends have some freedom to rotate with respect to each other.

2. The pipe joint claimed in claim 1, in which said telescoping means includes a cylindrical member telescopingly and sealingly slideable within both pipe ends.

3. The pipe joint claimed in claim 1, in which said telescoping means includes first and second bearing members, each bearing member defining a male spherical bearing surface mating with a corresponding female spherical bearing seat provided in one of the two pipe ends, the two bearing members also defining female cylindrical bearing seats mating with corresponding male cylindrical bearing surfaces on the ends of a cylindrical member which constitutes a telescoping member, whereby the pipe joint has freedom to expand and contract axially and to articulate in planes containing the axes of the pipe ends.

4. The pipe joint claimed in claim 1, in which the fluid conduit means comprises a conduit directly communicating the interior of said one of the pipe ends with the cylinder volume lying between said piston and said cylinder bottom, whereby the pressure inside said cylinder volume is the same as that within said one of the pipe ends.

5. The pipe joint claimed in claim 1, in which the telescoping means includes generally cylinderical means which at either end is in fluid-tight, articuable connection with a respective pipe end through spherical bearing means.

6. The pipe joint claimed in claim 5, in which the spherical bearing means includes first and second ring members telescopingly slideable within said first and second pipe ends respectively, each ring member defining a female spherical bearing seat, the cylindrical means being a cylindrical member having at each end a male spherical bearing surface mating with a respective female spherical bearing seat in a ring member, whereby the pipe joint has freedom to expand and contract axially and to articulate.

7. The pipe claimed in claim 5, in which the generally cylindrical means includes a first cylindrical member defining at one end a male spherical bearing surface mating with a female spherical bearing seat defined in one pipe end, and a second cylindrical member defining at one end a male spherical bearing surface mating with a female spherical bearing seat defined in the other pipe end, the other ends of the cylindrical members being in sealed telescoping relation with each other.

8. The pipe joint claimed in claim 5, in which the spherical bearing means includes a cylindrical member in sliding telescopic engagement at each of its ends with one of two ring members, each ring member having cylindrical inner surface in contact with the cylindrical member, and defining two outer spherical male surfaces of which the centres of curvature are spaced apart along the axis of the cylindrical member so that the axial section of each ring member is an ogive, each pipe end fixedly supporting a ring portion defining an internal female spherical surface mating with one of the male surfaces of the corresponding ring member, and a floating annulus between the ring portion and the other male spherical surface of the ring member, and sealing means between the mating surfaces of the cylindrical member, the ring member, the ring portion and the floating annulus.

* * * * *